Figure 1:
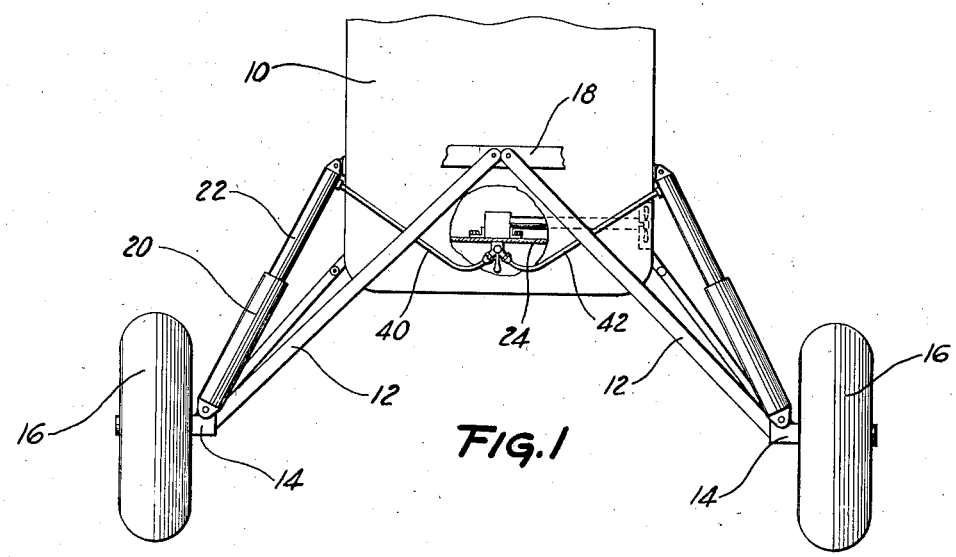

Sept. 22, 1936.   J. R. CAUTLEY   2,055,248
OLEO GEAR
Filed May 31, 1932

INVENTOR.
JOHN R. CAUTLEY
BY
ATTORNEY

Patented Sept. 22, 1936

2,055,248

UNITED STATES PATENT OFFICE 2,055,248

OLEO GEAR

John R. Cautley, South Bend, Ind., assignor to Bendix Aviation Corporation, South Bend, Ind., a corporation of Delaware Application May 31, 1932, Serial No. 614,542

3 Claims. (Cl. 244—2)

This invention relates to pumps for pneumatic shock struts and more particularly to booster pumps for pneumatic shock struts.

Broadly, the invention comprehends a pump for forcing air into a shock strut at the desired number of pounds per square inch pressure. This may be accomplished by admitting air to the pump under the initial pressure from a hanger air line or other suitable source of supply and then boosting the air pressure to the required number of pounds per square inch by means of a hand pump.

Because of a structure of this character a considerable saving in time and labor may be effected over a method of raising air from atmospheric pressure to the required number of pounds per square inch by an ordinary hand pump. Furthermore, in the present invention the structure is such that it is not necessary to jack an airplane up before inflating the strut or struts as the weight can be lifted directly by the pump.

The invention further comprehends the installation of a pump in the fuselage of an airplane and connecting the pump with shock absorbing struts so that the device will always be readily accessible, not only to supply air to the shock struts under initial pressure from the source of supply, but also to boost the pressure to the required number of pounds per square inch.

An object of the invention is to provide means for admitting air to a shock strut under initial pressure such as may be found in any suitable source of supply and then boosting the pressure to the required pounds per square inch.

Another object of the invention is to provide a device of the character described including means installed in the fuselage of a plane and connected directly with the shock absorbing struts attached between the axle and the fuselage of the plane.

A feature of the invention is a member having spaced check valves, one of which is connected to a three-way valve which in turn is connected by suitable tubing to shock struts, the other valve having a stem for the attachment of an air line and a booster hand operated pump connected with the member between the check valve.

Figure 2:
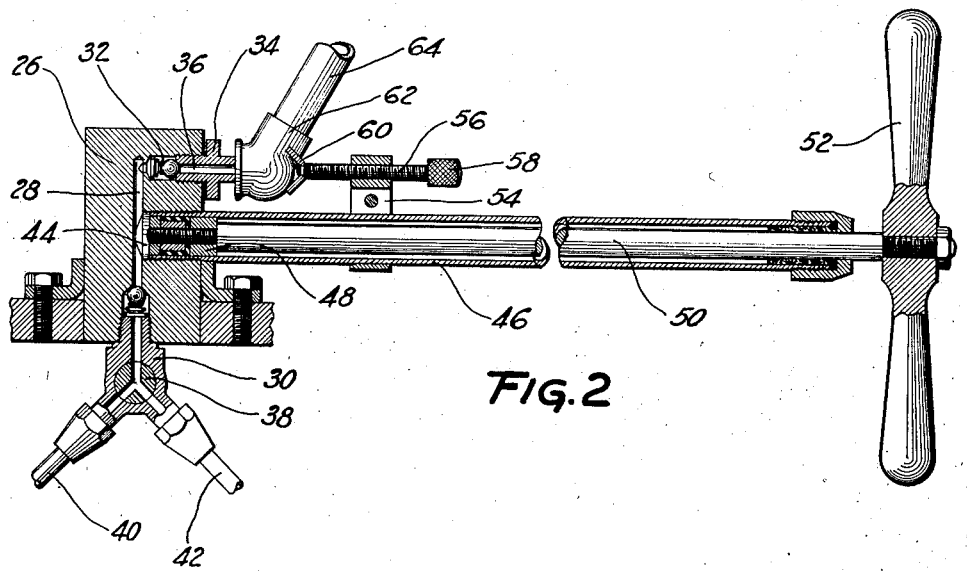

Other objects and features of the invention will appear from the following description taken in connection with the drawing which forms a part of this specification, and in which:

Figure 1 is a front elevation of an airplane illustrating the invention as applied; and Figure 2 is a longitudinal sectional view of the booster pump and its attachments.

Referring to the drawing for more specific details of the invention, 10 represents the fuselage of an airplane. As shown, the fuselage is supported on corresponding axle tubings 12 terminating in axles 14 on which are mounted for rotation conventional wheels 16. The axle tubings 12 are pivotally secured to a cross member 18 connected between the longérons of the fuselage. The axles are further supported by suitable drag struts 20, and connected between the axles 14 and the fuselage are corresponding shock absorbing struts 22.

Floor boards 24 arranged within the fuselage have bolted or otherwise secured thereto a block 26 having a passage 28, in one end of which is positioned a check valve 30, the other end of the passage communicates with a passage 32 in which is seated a check valve 34, and the passage 32 has threaded therein a valve stem 36. Threaded into the passage 28 and controlled by the check valve 30 is a three-way valve 38 connected by suitable tubings 40 and 42 to the shock absorbing struts 22.

The block 28 has an opening 44 communicating with the passage 28 and threaded in the opening 44 is a pump cylinder 46 having positioned therein a piston 48 connected by a suitable rod 50 to a handle 52.

The cylinder of the pump has suitably secured thereto a bracket 54 in which is threaded a screw 56 having upon one end thereof a thumb nut 58 and a concave disk 60 on its other end. The disk 60 is adapted to clamp a nozzle 62 on the valve stem 36, the nozzle 62 being suitably connected to a supply line 64.

The pump is permanently installed in an airplane in such a position that it may be readily accessible for operation from outside of the plane. As shown, the pump is connected between the check valves 30 and 34, the check valve 30 controls the passage to the three-way valve 38 connected to the shock struts by suitable tubes, and the valve 34 controls the air line 64 when connected to the valve stem 36. Both the air line connection, and the three-way valve are located so as to be readily accessible from outside of the plane, and the three-way valve provides means whereby the pump cylinder may be connected to either of the shock struts or may be shut off entirely as may be desired.

When it is desired to inflate one of the struts, the three-way valve is turned to connect the given strut to the pump and the external air line is attached at the valve stem 36. In this assembly the pump will fill up with air to the pressure in the air line. Hence, when the booster hand pump is operated the check valve at the air line connection will close immediately and the check valve at the three-way valve will open as soon as sufficient pressure has been built up in the pump cylinder to overcome the strut pressure. Air will thus be delivered to the strut with each stroke of the booster hand pump until the strut has been filled to the desired pressure. The three-way valve may then be turned to the closed position and the external air line disconnected. It may be found desirable to also install a check valve at the point of attachment of the tubing to the shock strut.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is:

1. In an airplane, a fuselage, a chassis supporting the fuselage, corresponding shock struts connected between the chassis and the fuselage, a member on the fuselage having a passage, means for connecting the passage with the shock struts, means for connecting a compressed air supply line to the passage and securing the same in place, a check valve in the passage controlling the air line, a check valve in the passage controlling the connections to the struts, and an auxiliary hand operated means for further compressing air connected to the passage between the check valves said auxiliary means being adapted by hand operation to raise a supply line pressure of the order of six atmospheres to a pressure of the order of forty atmospheres in a single compression stage.

2. In combination, an air pump having an inlet fitting, a compressed air supply hose adapted to be attached and detached quickly from said inlet fitting, and means on said pump for holding said air hose on said inlet fitting.

3. In combination with an airplane having fluid pressure shock struts a member on the airplane having a passage, means for connecting the passage with the shock struts, means for connecting a compressed air supply line to the passage and securing the same in place, a check valve in the passage controlling the air line, a check valve in the passage controlling the connection to the struts and an auxiliary hand operated means for further compressing air connected to the passage between the check valves, said auxiliary means being adapted by hand operation to raise a supply pressure of the order of six atmospheres to a pressure of the order of forty atmospheres in a single compression stage.

JOHN R. CAUTLEY.